US012802527B2

(12) United States Patent
Acres

(10) Patent No.: US 12,802,527 B2
(45) Date of Patent: *Nov. 17, 2026

(54) AUTOMATIC APPLICATION OF A BONUS TO AN ELECTRONIC GAMING DEVICE RESPONSIVE TO PLAYER INTERACTION WITH A MOBILE COMPUTING DEVICE

(71) Applicant: ACRES TECHNOLOGY, Las Vegas, NV (US)

(72) Inventor: John F. Acres, Las Vegas, NV (US)

(73) Assignee: Acres Technology, Las Vegas, NV (US)

( * ) Notice: Subject to any disclaimer, the term of this patent is extended or adjusted under 35 U.S.C. 154(b) by 748 days.

This patent is subject to a terminal disclaimer.

(21) Appl. No.: 16/898,767

(22) Filed: Jun. 11, 2020

(65) Prior Publication Data

US 2020/0302750 A1 Sep. 24, 2020

Related U.S. Application Data

(63) Continuation of application No. 15/704,490, filed on Sep. 14, 2017, now Pat. No. 10,726,673.

(60) Provisional application No. 62/396,953, filed on Sep. 20, 2016.

(51) Int. Cl.
*G07F 17/32* (2006.01)

(52) U.S. Cl.
CPC ...... *G07F 17/3267* (2013.01); *G07F 17/3209* (2013.01); *G07F 17/3218* (2013.01); *G07F 17/3225* (2013.01); *G07F 17/3244* (2013.01)

(58) Field of Classification Search
CPC ............ G07F 17/3267; G07F 17/3209; G07F 17/3218; G07F 17/3225; G07F 17/3244
See application file for complete search history.

(56) References Cited

U.S. PATENT DOCUMENTS

| | | | | |
|---|---|---|---|---|
| 8,827,160 | B1 | 9/2014 | Pascal et al. | |
| 9,183,560 | B2 | 11/2015 | Abelow | |
| 9,226,106 | B1 | 12/2015 | Kornmann et al. | |
| 2011/0306400 | A1* | 12/2011 | Nguyen | G07F 17/3223 463/20 |
| 2012/0276997 | A1 | 11/2012 | Chowdhary et al. | |
| 2013/0084961 | A1 | 4/2013 | Radisich et al. | |

(Continued)

OTHER PUBLICATIONS

Pokemon Go Review, Uploaded by ProJared, Jul. 21, 2016 https://youtube.com/watch?v =-DM5DkP7ca0.

*Primary Examiner* — Jeffrey K Wong
(74) *Attorney, Agent, or Firm* — Ballard Spahr LLP

(57) ABSTRACT

A computer-implemented method of activating a secondary game on a mobile computing device associated with a primary game on one of a plurality of networked electronic gaming machines in which an optical code is affixed to each gaming machine. Each optical code is stored in electronic form in a database and is associated with at least one bonus award that may be collected by a player of the gaming machine to which the stored optical code is affixed. An electronic optical code associated with one of the gaming machines is received responsive to scanning with a camera on the mobile computing device. The player may apply at least one of the bonus awards to the one electronic gaming machine in response to an input received at the mobile computing device. In one aspect, the mobile computing device displays real and virtual worlds.

20 Claims, 13 Drawing Sheets

(56) References Cited

U.S. PATENT DOCUMENTS

| | | | | |
|---|---|---|---|---|
| 2013/0137510 | A1 | 5/2013 | Weber | |
| 2013/0267327 | A1* | 10/2013 | Froy, Jr. | G07F 17/3223 463/42 |
| 2014/0141864 | A1 | 5/2014 | Ward et al. | |
| 2014/0364199 | A1 | 12/2014 | Baerlocher et al. | |
| 2015/0011309 | A1 | 1/2015 | Eloff et al. | |
| 2015/0177968 | A1 | 6/2015 | Kornmann et al. | |
| 2016/0042599 | A1* | 2/2016 | Toohey | G07F 1/3241 463/25 |
| 2016/0224204 | A1 | 8/2016 | Kornmann | |
| 2017/0178443 | A1* | 6/2017 | Calhoun | G07F 17/3211 |
| 2017/0256124 | A1 | 9/2017 | Arumugam et al. | |
| 2017/0256132 | A1 | 9/2017 | Lyons et al. | |
| 2018/0082536 | A1 | 3/2018 | Acres | |

* cited by examiner

AUTOMATIC APPLICATION OF A BONUS TO AN ELECTRONIC GAMING DEVICE RESPONSIVE TO PLAYER INTERACTION WITH A MOBILE COMPUTING DEVICE

RELATED APPLICATIONS

This application is a continuation of U.S. patent application Ser. No. 15/704,490, filed Sep. 14, 2017, which claims priority to and the benefit of U.S. Provisional Application No. 62/396,953, filed Sep. 20, 2016, which are incorporated herein by reference in their entirety.

BACKGROUND

The embodiments of the invention presented here provide a system and method for permitting players of casino wagering games to access bonuses on electronic gaming machines (EGMs) using their smartphones. Awards may be mapped to different ones of EGMs in accordance with management goals. These include increasing overall revenue, decreasing costs, achieving marketing goals, attracting players from competitors, and attracting players at times when there typically fewer players on a casino floor.

DETAILED DESCRIPTION OF EMBODIMENTS

Figure 1:
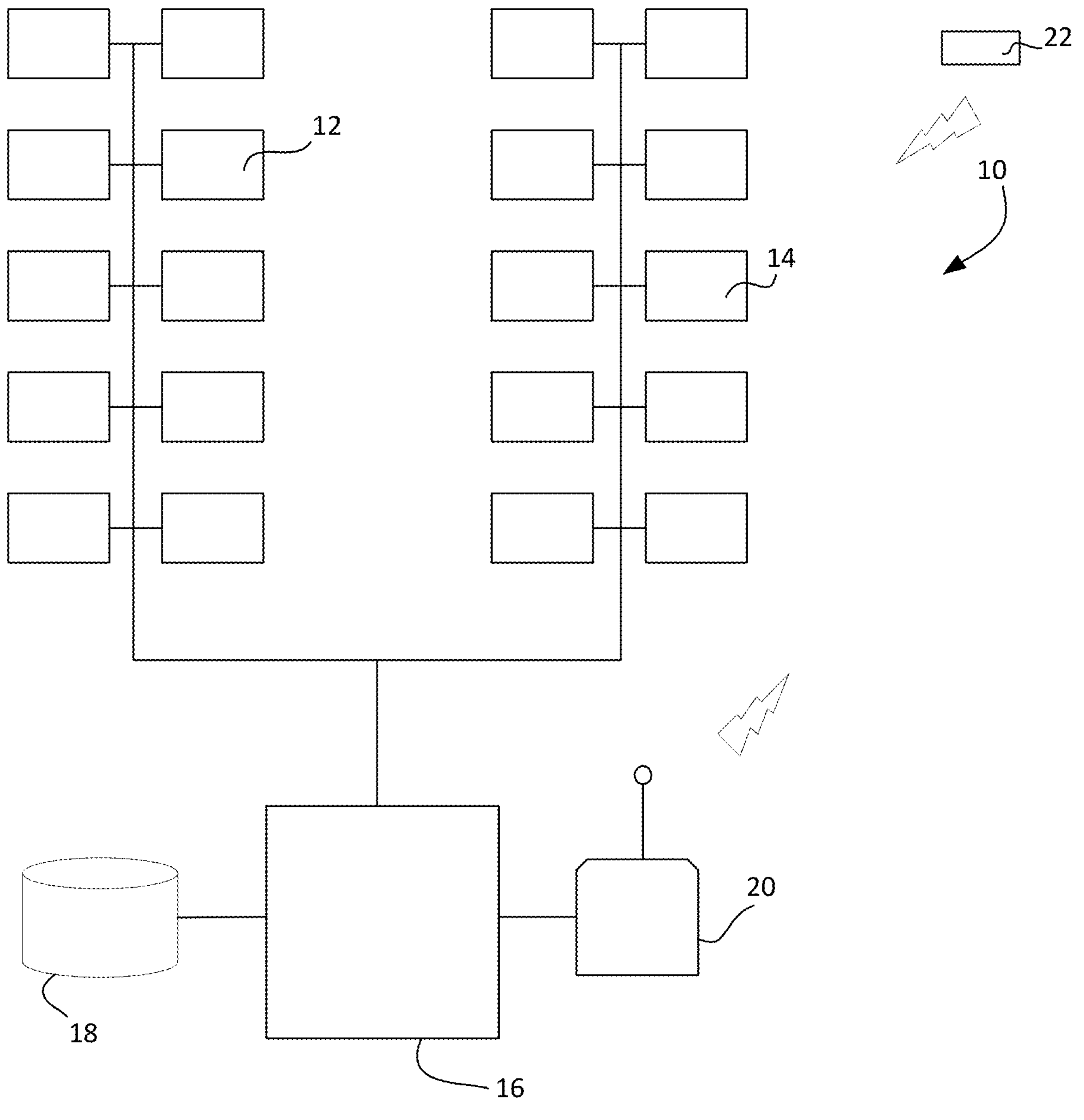
FIG. 1 is a schematic depiction of a system including a network of EGMs on a casino floor that implements one embodiment.

Turning first to FIG. 1, indicated generally at 10 is a highly schematic diagram that depicts a system, including a network of EGMs, on a casino floor. The embodiments of the invention may be implemented using the system that is described in applicant's U.S. Pat. No. 9,087,431, which is hereby incorporated by reference.

That patent includes the details of a system that uses a wireless network connected to a network of EGMs to dispatch casinos employees to EGMs to provide service of one sort or another. In one embodiment described in the '431 patent, employees carry Apple® mobile computing devices that notify an employee of a service call at an identified EGM via a notification on the mobile computing device. A similar system, like that shown in FIG. 1, may be used to implement embodiments of the present invention in which players interact with the network via mobile computing devices, which may be the players' own smartphones.

System 10 includes a plurality of networked EGMs, like EGMs 12, 14, which are connected by the network to a computing system 16. At least one of the EGMs is associated with a code that is accessible to the player. The code is associated with one or more EGMs. In one embodiment, the code is an optical QR code, which is uniquely associated with a single EGM and is visible to the player. In another embodiment, the code may be accessible to the player via near-field magnetic sensors or an RFID device. In one embodiment the code may be associated with a multiple EGMs that share a common trait, such as game type, cabinet type, etc. More about the QR code later.

The embodiments are implemented in part via computer code that may appear in a memory (not shown) associated with system 16 or may appear in other computers connected to the network either locally or via a global computer network. In addition, in one embodiment, some of the computer code appears on mobile computing devices. As a result of distributed computing, the computer code may be spread out among multiple computing devices.

A plurality of databases, only one of which, database 18, is shown are operatively connected to computing system 16. The databases may include information about a player's demographic, psychographic, play history or other behavioral patterns, which is described in more detail in the '431 patent. Additional databases may include accounting data related to the coin in, coin out and jackpots paid at each of the EGMs and a database for service calls as described in the '431 patent. One database that is used to implement the current embodiments is discussed later in more detail.

Also included in system 10 is a wireless network, including a transceiver 20 for transmitting electronic data to and from mobile computing devices, like device 22. In one embodiment mobile computing device 22 is a player's personal smartphone. Only one device 22 is depicted but the system can accommodate numerous devices, associated with multiple players. Alternately the mobile device may be owned by the casino and carried by an employee and then loaned to players for use. More details about how devices, like device 22, communicate wirelessly with system 10 are found in the '431 patent.

Consideration will now be given to how a player uses his or her smartphone to interact with system 10 with references to FIGS. 2-9. In this embodiment an application, commonly referred to as an app, is loaded onto the smartphone. The app may be obtained from a website or from an app store accessible via the Internet. Further description of the app will be made with reference to the flow charts in the drawings.

Figure 2:
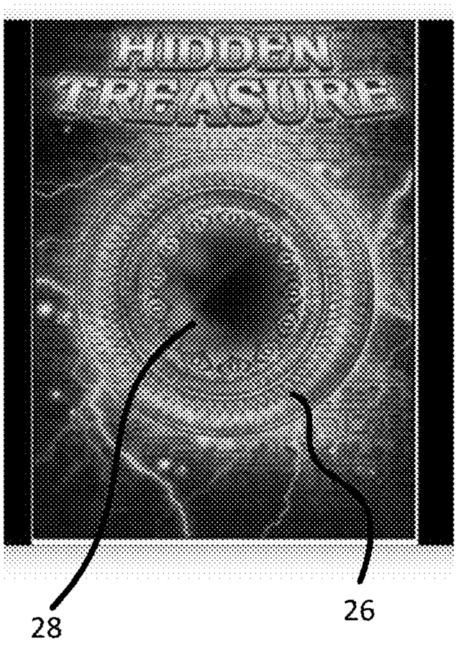
FIGS. 2, 4, 5, 7, and 9 are screen images of a smartphone that depict a portion of one embodiment.

First, the player starts his or her app, typically by touching an icon on the smartphone. An initial image 24 is shown in FIG. 2. It includes the name of the bonus feature, in this case Hidden Treasure, at the top of the player's smartphone screen. Artwork, including an oval ring 26, surrounds a central opening 28. The central opening contains the image from the camera on the smartphone. In other words, the image on the screen is made up of two portions, one being the artwork that is presented by the app and the other being a camera image that captures an image of wherever the player aims the camera. Layering of a virtual image, like the artwork in FIG. 2, with a real camera image is a known technique. It may be implemented in a manner similar to that in the popular game Pokémon GO.

Figure 3:
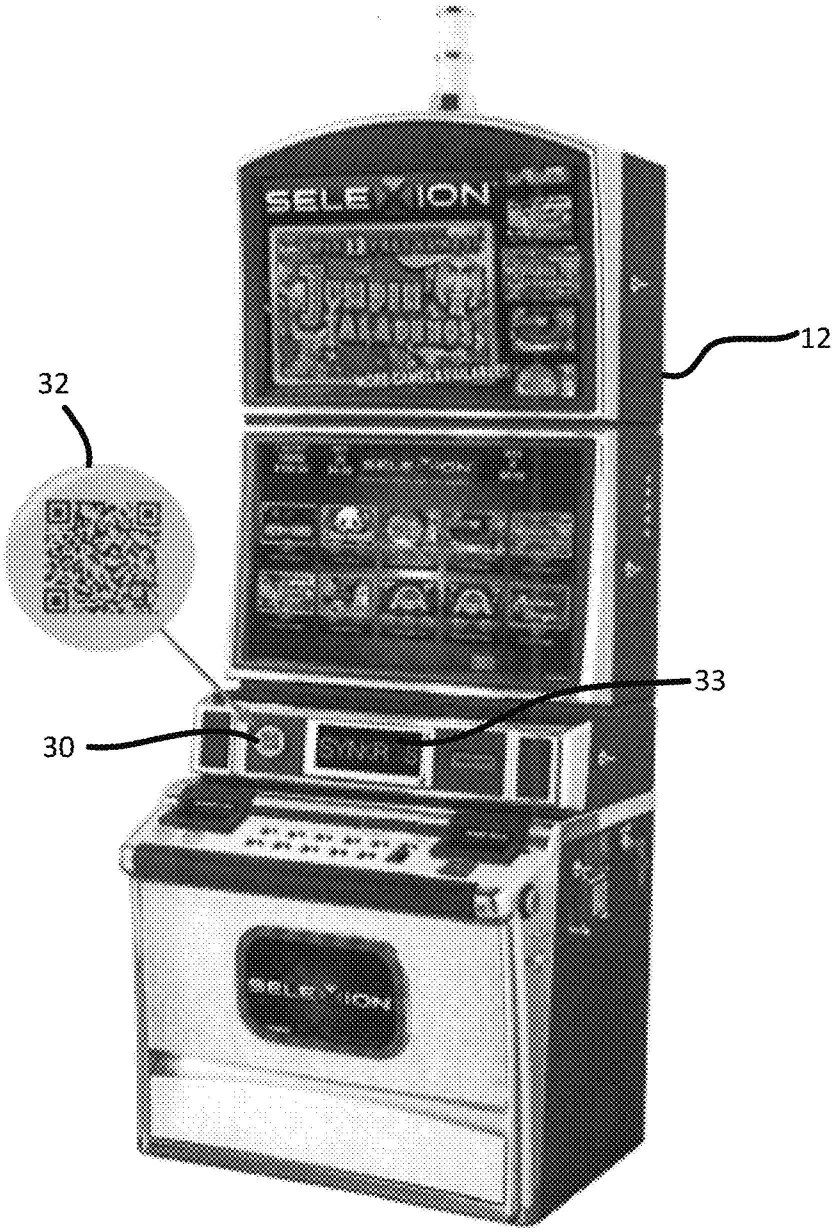
FIG. 3 is one of the EGMs from FIG. 1 showing an optical code affixed to it.

FIG. 3 depicts EGM 12, one of the networked machines in FIG. 1. An optical code, in this case a QR code 30, is affixed, and uniquely associated, to EGM 12. An enlarged version 32 of QR code 30 is shown exploded from EGM 12. The EGM also includes a secondary display screen 33 on which player tracking and other information is presented to a player.

Figure 4:
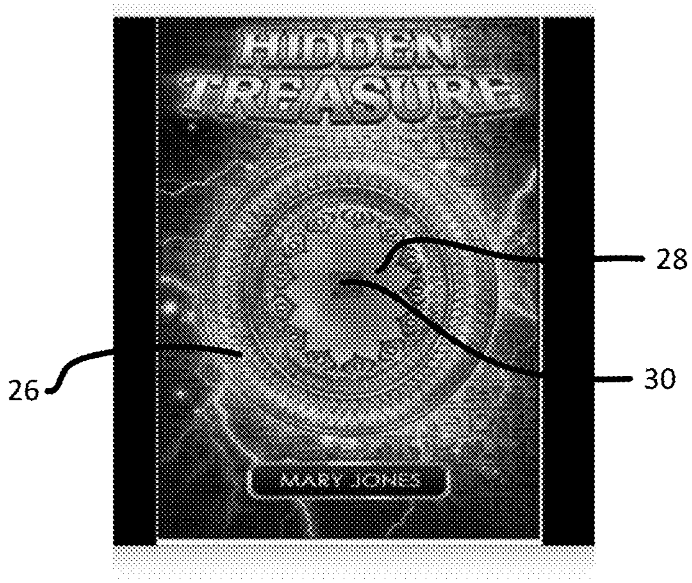

In FIG. 4, the player aims his or her smartphone camera at QR code 30 on EGM 12. As will be described in more detail later, the QR code is wirelessly transmitted by the smartphone to computing system 16, which thereby associates the smartphone with an identified one of the machines. Alternatively, the QR code could also appear on the main screen of the EGM or a secondary screen. It could be a pixel pattern on either of those screens. As described earlier, other techniques besides an optical code could be used, e.g., a proximity chip carried by the player could trigger the EGM or the smartphone when the player is closely adjacent the EGM.

In FIG. 4, the player's name appears. The name may appear as a result of the smartphone and the app thereon being associated with the player's record in the player tracking system. Another way is for the player to simply enter his or her name and store it with the app.

Figure 5:
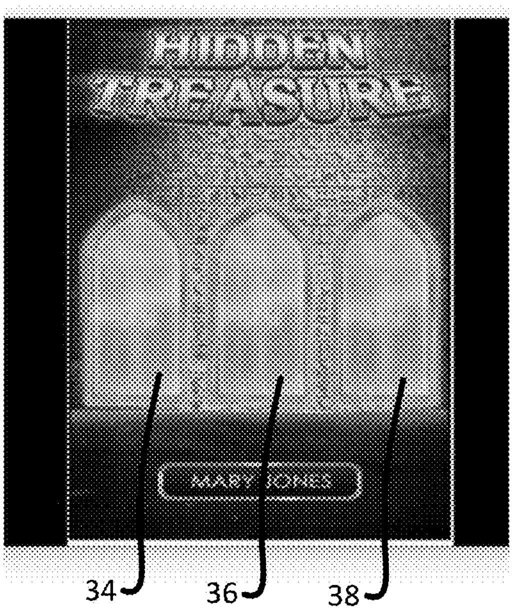

Once the QR code is captured and transmitted to system 10, the image in FIG. 5 appears. Three doors 34, 36, 38 are presented to the player who choses one of the doors, typically by touching the door on the smartphone screen. Once doors 34, 36, 38 are presented, the player has a predetermined amount of time, e.g., 30 seconds, to insert his or her player tracking card 40 into a player tracking card slot 42 at EGM 12, shown in FIG. 6. In one embodiment an image of a count clock, not shown in FIG. 5, is presented on the smartphone screen and counts down from 30 seconds so the player knows how much time remains to insert card 40.

Figure 7:
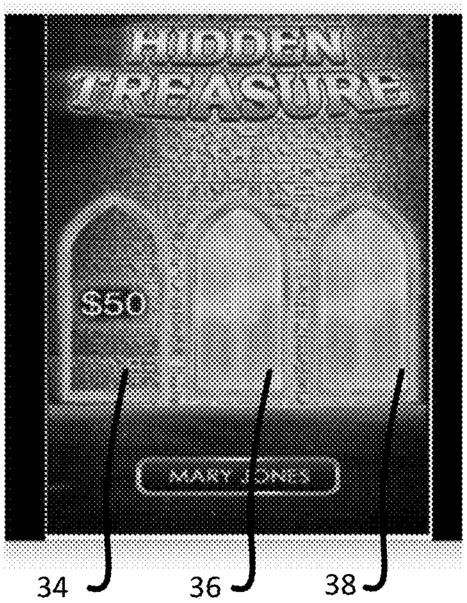
Figure 8:
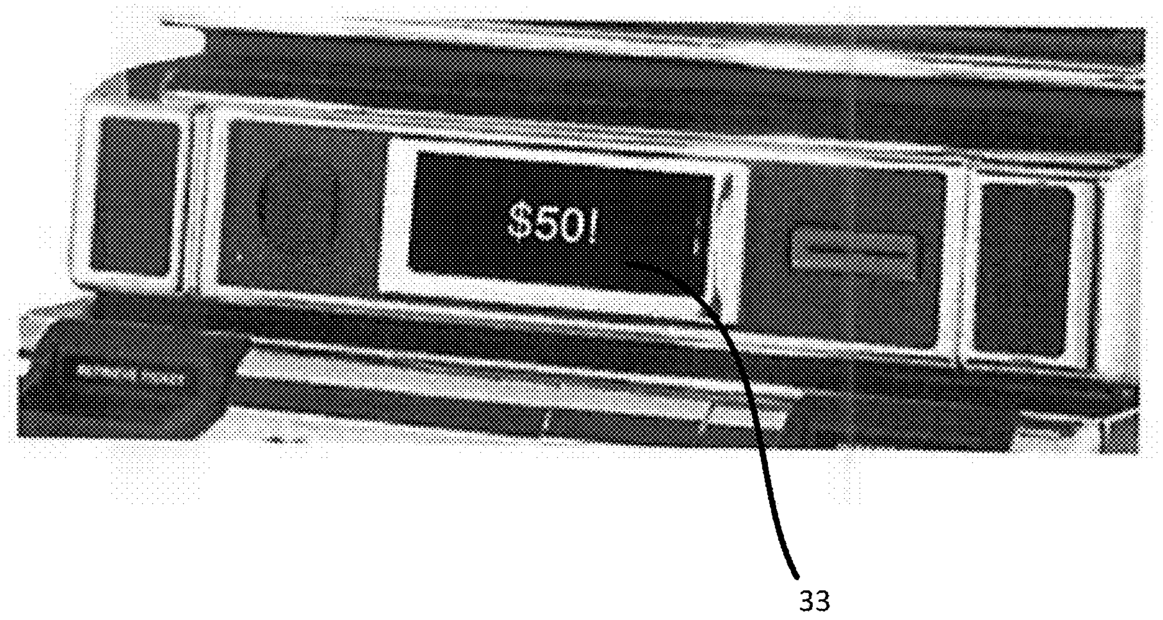
FIG. 8 is a view of a screen at the EGM showing a bonus amount.

Once the player inserts his or her card, the doors become active and the player picks one. In FIG. 7, it can be seen by that player Mary Jones touched first door 34, which when touched revealed that Mary has been awarded a bonus of $50. In FIG. 8, the bonus award of $50 is shown on display screen 33 at EGM 12. The award may be applied to the machine's credit meter or to a player tracking account or other electronic account that the player may access.

Figure 9:
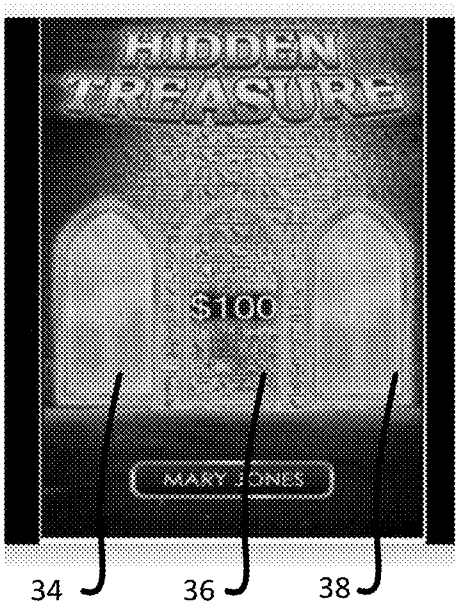

FIG. 9 is an alternate depiction showing that if Mary had picked the middle door 36, she would have won $100. In this embodiment, the player choses only one door. There may be awards of different amounts behind any two or more of the doors or there may be an award behind only one door.

In another embodiment, the doors become active before Mary inserts her card into a machine and Mary has a time period in which to insert her card thereafter. In another embodiment, the doors become active and Mary makes a door selection before entering her card into the machine.

The system is highly customizable. In addition to money applied to the EGM, the prizes may include cars, event tickets, food, or any other item the player might consider valuable. In addition, the award may include information, such as past players or winners of the game, past game behavior, historical performance of the EGM or predicted future performance based on, e.g., the extent to which the machine is paying over or under its designed hold percentage. The awards might also information unrelated to the game that players might perceive as valuable such as a horoscope reading.

The awards may be delivered in a variety of ways. Automated delivery as described above is efficient and rapid when EGM credits are awarded. But other types of awards might result in dispatch of a casino employee, using the techniques described in the '431 patent, to the player's machine for hand delivery of the award or of a document entitling the player to collect the award elsewhere. Also, the player could be directed to a website to collect the award or download a document that represents a right to an award.

Any of the awards may be made available only at limited times, which can be controlled by computing system 16 based on the time of day. Or the awards may fluctuate in value depending upon the date, whether the day is a holiday, or the time of day. This enables an operator of the EGMs to provide increased incentive to play during times when there are typically fewer players.

Figure 10A:
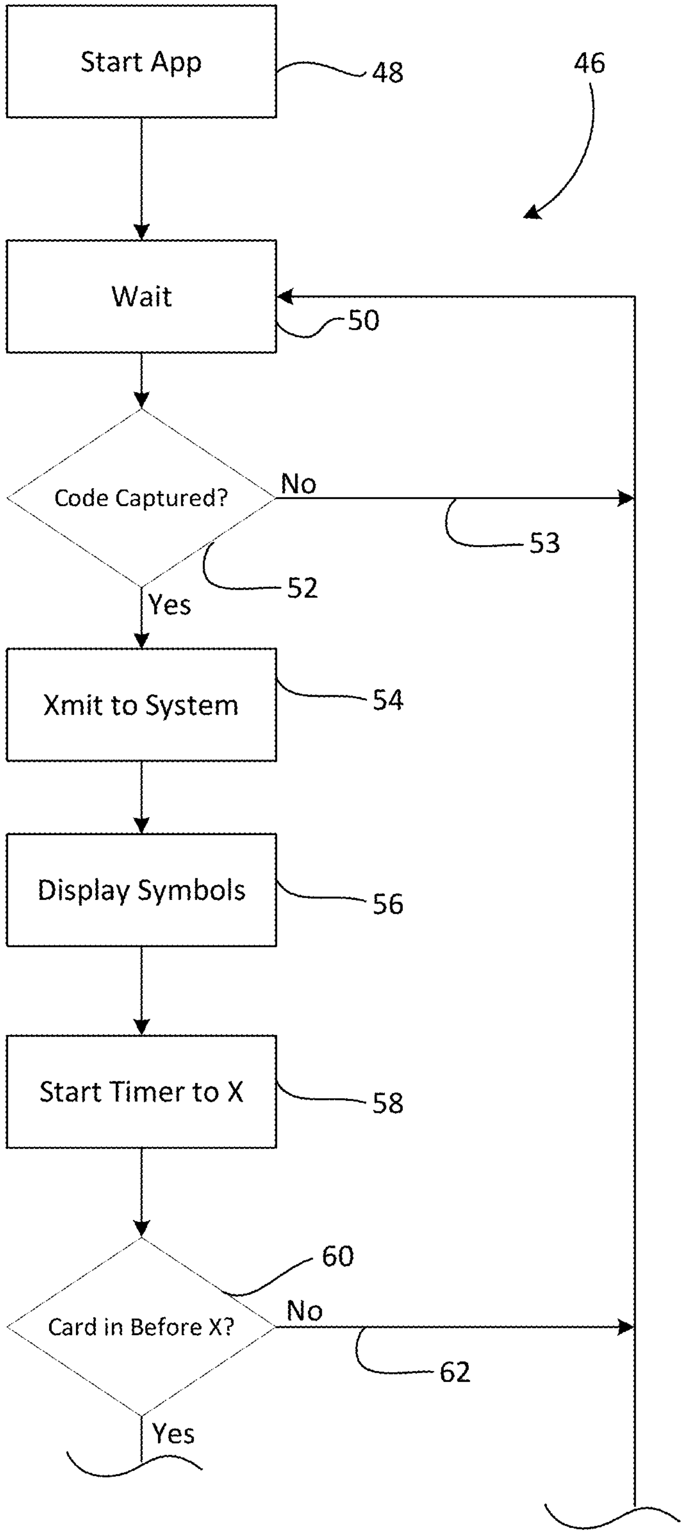
FIGS. 10A and 10B show a flow chart depicting a portion of the operation of computer code that implements a portion of one embodiment.
Figure 10B:
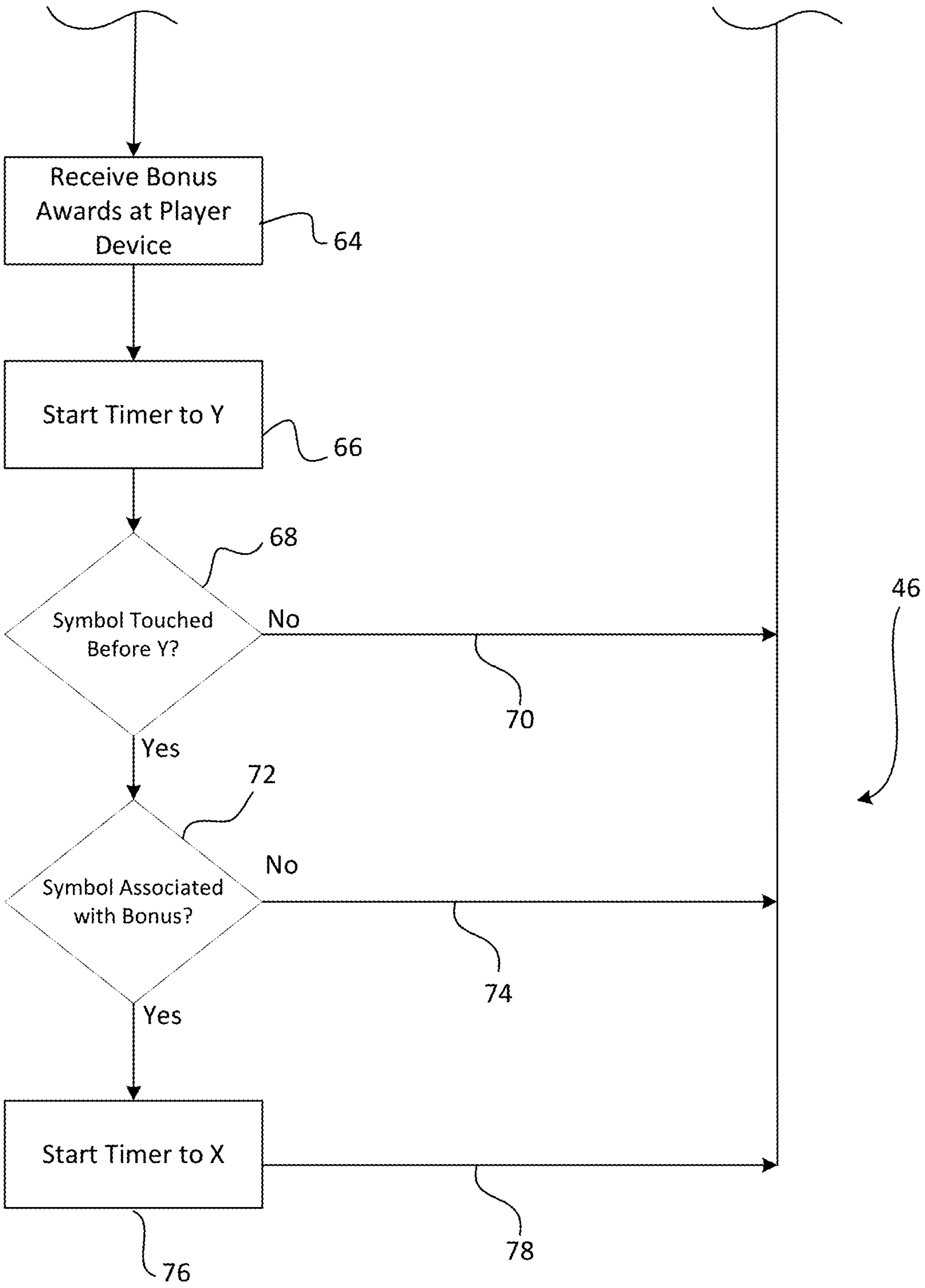

Turning now to FIGS. 10A and 10B, indicated generally at 46 is a flowchart of the sequence of operation of the present embodiment. These operations are implemented by computer code that is contained in part by the app on the player's mobile computing device, like device 22 in FIG. 1, typically a smartphone. After installing the app on his or her phone, the player starts the app at 48. The app is initially in a waiting mode, at 50, until the player points the camera in the smartphone at a QR code, as shown in FIGS. 3 and 4 for QR code 30, which is on EGM 12. After doing so, the code is captured by the app at 52 in a known manner. If the code is not captured, the process returns, via 53, to wait again at 50. Next, the phone, under control of the app, transmits (at 54) the QR code via the wireless network, to computing system 16.

Figure 6:
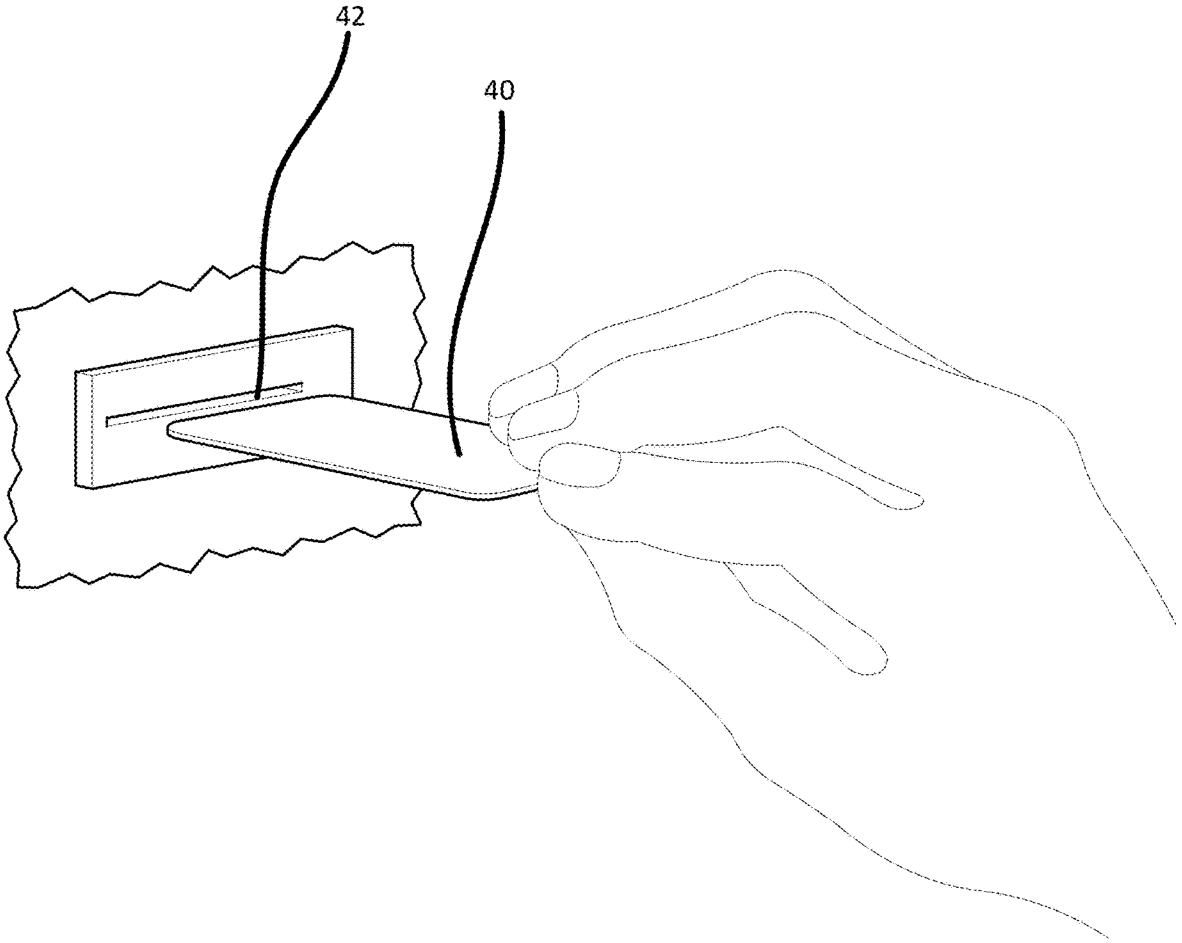
FIG. 6 is a view of a player's hand inserting a player tracking card into a slot at the EGM.

After doing so symbols are displayed, at 56, in this case doors 34, 36, 38, as shown in FIG. 5. At 58, a countdown timer is started substantially simultaneously with display of the symbols. The countdown can be any length of time and may be set by the operator of the EGMs. In this case the timer counts down from 30 seconds, which is the time the player has to insert his or her card into a player tracking module as shown in FIG. 6. In one embodiment, the timer count may appear on the smartphone display, although that is not shown in the present drawings.

At 60, if the card is not inserted within the X countdown time, the program returns, via 62, to wait again at 50. If, on the other hand, the card is inserted before the timer runs out, the flow continues to 64 in FIG. 10B. Although not shown in the flow, data from the player-tracking card that identifies the player, along with the machine identity where the card is inserted, is transmitted via the EGM network in FIG. 1 to computing system 16 when the player-tracking card is inserted within the countdown time. As will be recalled, the optical code includes data that identifies the machine. As a result, computing system 16 associates an identified player with an identified EGM.

An operator of the EGMs may tailor award opportunities to apply to particular machines regardless of the player. An award opportunity is the number and amount of bonus credits behind the doors, e.g., an award of $10 behind one door; an award of $20 behind one door and $30 behind another; an award of $5 behind each of the three doors; etc. In this case, each player playing an identified machine receives the same award opportunity. Different machines may deliver different award opportunities, but each player playing a particular machine receives the same award opportunity at that machine. For example, every player at EGM 14 may be shown 3 doors with only one having a $25 bonus behind it. The bonus amounts may be randomly or otherwise assigned to different doors for each use so that the player does not discern a pattern regarding which door is most likely to conceal an award.

Conversely, a bonus may be tailored to apply to particular players regardless of which machine is being played. In this case, each player receives the same award opportunity regardless of which machine they are playing, although different players may receive different award opportunities. For example, Mary Jones may be shown 3 doors with one of the doors having a $10 bonus behind it and another having a $50 bonus behind it. And this is true for each machine she plays.

In a third possibility, the bonus opportunity is a function of both the identified player and the identified machine.

These three options may be implemented by databases, like database 18 in FIG. 1, which are accessible by computing system 16. As described in the '431 patent, a player tracking system tracks players and wagers. A different set of award opportunities may be entered into the players' records in the player-tracking database, i.e., different from one player to another. There is also a database that lists each machine and its corresponding machine number. Different award opportunities may be entered into that database for the machines, i.e., different from one machine to another.

Creation of different award opportunities may be accomplished in a number of ways. For example, each machine could have a plurality of different award opportunities. One may be chosen at random. Or one may be chosen based on the player tier, i.e., the value of the player, in the player tracking system. Each player's record may also include multiple award opportunities that might vary dependent upon which machine they play or how much the player has wagered over a period of time. Or instead of award opportunities, one database could include a multiplier that multiplies the award opportunities in the other database.

At 64, an award opportunity, determined in one of the ways described above, is transmitted to the player's smartphone at 64. The award amount or amounts may be briefly displayed on the smartphone screen before disappearing behind one or more doors without disclosing to the player where any award is.

At 66 another countdown timer is started to define the time, Y seconds (e.g., 30 seconds), in which the player must select one of the doors. In one embodiment, the count appears on the smartphone screen so the player knows how much time he or she has to touch a door. At 68, if the player does not touch a door before the timer run out, the process returns to wait at 50 via 70. And if the player does touch the door before the time runs, the process determines if there was an award behind the touched door at 72. Although not shown in the flow chart, a signal indicating which door was touched is transmitted by the smartphone to computing system 16. If not, the process returns to wait at 50 via 74. If the symbol is associated with a bonus, as shown in FIG. 7, the bonus is delivered to the EGM via the network in FIG. 1 by computing system 16. At 76, the award amount is displayed at the EGM as shown in FIG. 8 and may be either applied to the credit meter on the EGM or applied to a player account. The process then returns to wait at 50 via 78.

Figure 11A:
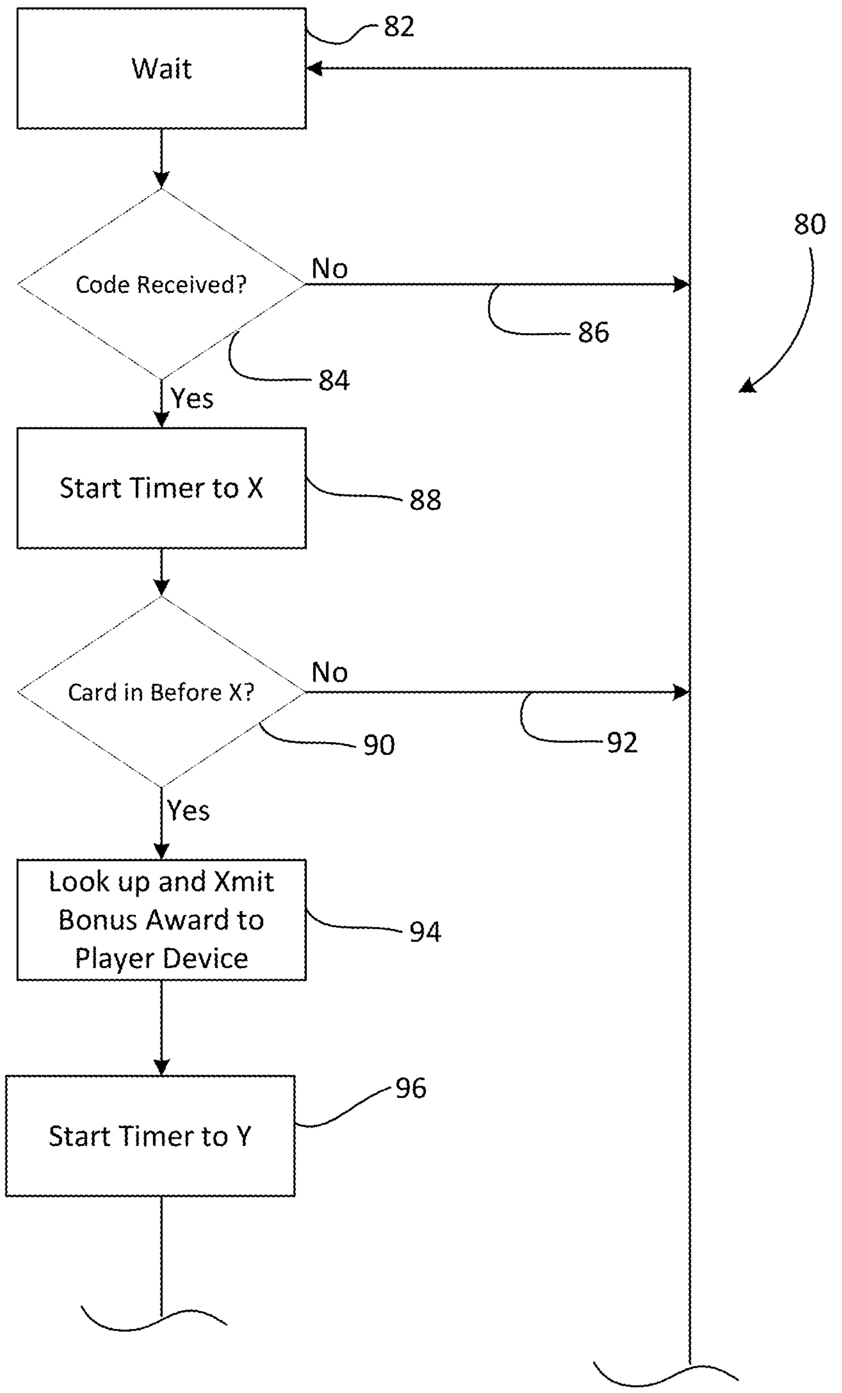
FIGS. 11A and 11B show a flow chart depicting a portion of the operation of computer code that implements another portion of one embodiment.
Figure 11B:
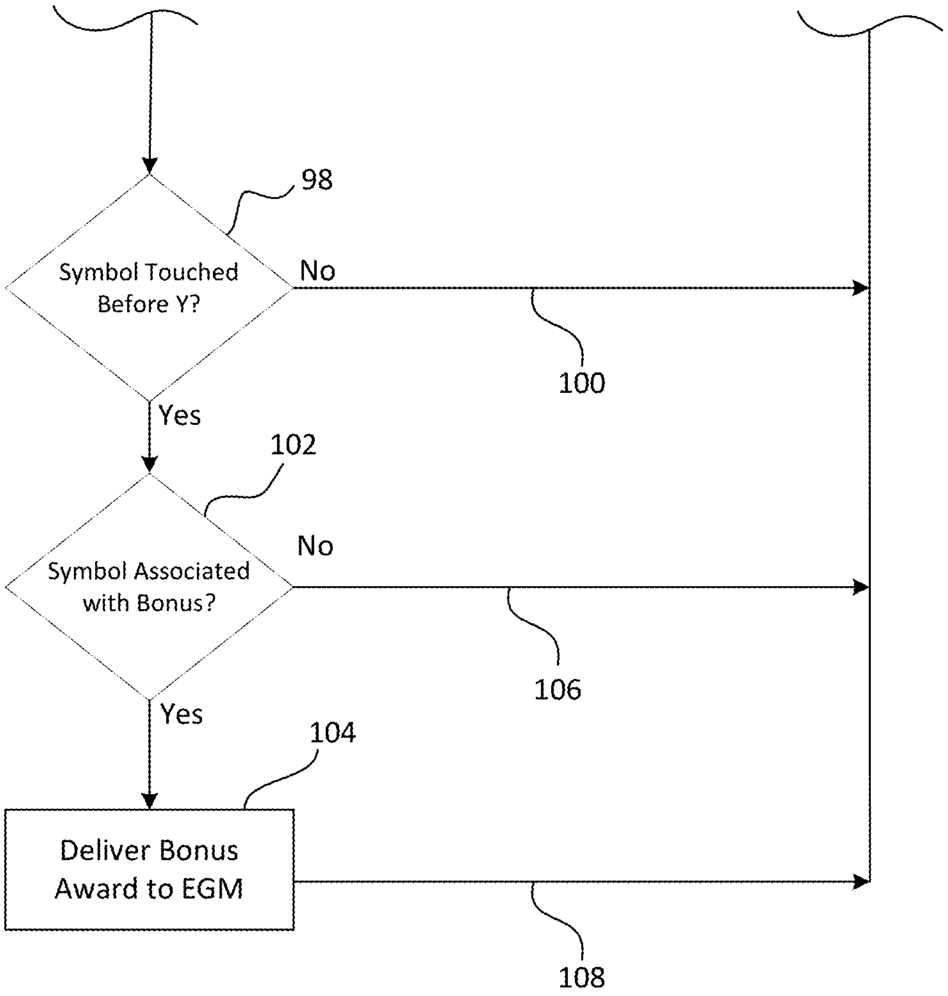

Turning now to FIGS. 11A and 11B, indicated generally at 80 is another flowchart of the sequence of operation of the present embodiment. The operations are implemented by computer code that is contained in part in a memory (not shown separately) associated with computing system 16. The following description tracks in time the same sequence of operation described above with respect to the smartphone app, but focuses more on operations at computing system 16.

The process waits at 82 for receipt of the data contained in a scanned optical code from one of the players' smartphones. At 84, if no code is received, the process reverts back, via 86 to wait again at 82. When a code is received, the process continues to start timer X at 88. This is the same timer X from the flow chart of FIGS. 10A and 10B. It should be appreciated that there is typically only one timer, most likely contained in computing system 10, but it is included in both flow charts to indicate the process stages at both the smartphone and computing system 16 relative to the timer.

At 90, if a card-in indication is not received via the EGM network before the timer runs, the process returns via 92 to wait at 82. If it is received, at 94 computing system 16 consults at least one of the player-tracking database and the machine identity database to select an award opportunity as described above. Then the timer to Y starts at 96. As with the timer to X, there is typically only one timer. If the symbol is touched at 98 (in FIG. 11B) before the timer to Y runs, a signal is transmitted from the smartphone via the wireless network to computing system 16 indicating which door was touched. If a symbol is not touched before the timer runs to Y, the process returns via 100 to wait at 82.

Computer system 16 determines if the touched symbol is associated with a bonus at 102, and if so delivers it to either the credit meter of the player's EGM or to an electronic account of the player at 104 via the EGM network. The amount is displayed as in FIG. 8. If the process determines that the signal is not associated with an award at 102, the process returns to wait at 82 via 106. After an award is delivered and displayed, the process returns to wait at 82 via 108.

In another embodiment, when the award opportunities are all specific to machines regardless of the player identity, the award opportunities are delivered to the smartphone substantially simultaneously with display of the symbols. From the player's perspective, the app operates substantially the same way as described above.

In one embodiment, the system may be programmed in a manner that creates an incentive to play to earn bonus opportunities. For example, each player coming into the casino may be provided with an initial opportunity to participate in the bonus feature described above. Or the player may have to wager a predetermined amount, e.g., $100, before being given an opportunity to play. Because computing system 16 has access to player records in the player-tracking system, different players, depending upon their tier in the player-tracking club, may be provided with different opportunities or a different number of playable bonus features, or both. A newly enrolled player in the player-tracking club may receive more or better opportunities.

In one example, a player who plays several times per month and wagers an average of $250 each visit might be given 3 uses, which must be used during the visit, after wagering $100 and an additional use for each additional $50 wagered. Of course the system could also be programmed to permit uses to be stored in the player's player-tracking record for use during a subsequent visit. The artwork on the smartphone screen could also present the number of uses remaining. These can be used at the player's option at different times during his or her visit.

In still another aspect, uses of the bonus feature could be earned as a result of the player's losses, which are tracked, or may be purchased with cash or loyalty points.

It is known that a new player's propensity to return to a casino is affected by the success of initial visits. If the player consistently loses, he or she is less likely to return. Of course the outcomes of the machines are all random. But a newly enrolled player in the player-tracking club can be given more initial uses, and as mentioned above, better reward opportunities. And the new player could accrue uses at a higher rate based on play, e.g., an additional use of the bonus feature for each $25 of wagers made by the player.

Because the system is highly customizable, different tiers or types of players can accrue uses at different rates of wagering. For example, one player might get a use for every $10 wagered and another for every $100 wagered. And because the system tracks jackpots by player, a player who is achieving low wins could have their rate of accrual bumped up, e.g., from one use for each $25 wagered to one use for each $15 wagered. The opposite could be implemented as well. In other words, if a player is consistently winning that player's accrual rate could change from one use for each $20 to one use for each $50. Both the award opportunities and the accrual of uses can be customized by groups of players or by an individual player.

In another embodiment, players may swap awards with one another or gift them to another player who uses the app. For example, a player having several uses remaining could first identify another player on the gifting player's smartphone. This could be via the recipient's mobile phone number, player-tracking ID, or other unique identifier. Through entry of a simple menu command on the app, the use is transferred to the recipient. This gifted use could show up immediately on the recipient's smartphone screen or the recipient could receive it the next time he or she plays one of the games. In addition, an email or text could be automatically sent informing the recipient of the gift. The gifted use could be limited by the giver to a particular machine or group of machines, by area or EGM model, or could be usable on all machines.

In addition to gifting and swapping awards or a portion of an award, a player could leave a message for another player that appears on the smartphone screen of the other player when he or she scans the optical code associated with the machine where the message was left. The messages and gifts can be stored in computing system 16, which associates it with three records: the record of the gifting player (or player leaving a message), the record of the player receiving the gift or message, and the machine number, or numbers, where the gift/message is disclosed to the recipient when the recipient captures the QR code on his or her smartphone.

These features are all readily implementable as a result of the system having access to both player identification, via the player-tracking system, and to the identity of each machine as a result of the optical code and corresponding database of machine identifiers.

The invention claimed is:

1. At least one non-transitory computer readable medium that stores a plurality of instructions, wherein the plurality of instructions, when executed by at least one processor, cause the at least one processor to:

receive, from a mobile computing device, a code associated with an electronic gaming machine and a mobile computing device identifier;

associate, based on the code associated with the electronic gaming machine and the mobile computing device identifier, the electronic gaming machine with a player account;

initiate a secondary game on the mobile computing device;

permit a player associated with the player account to play the secondary game on the mobile computing device;

receive an indication of an interaction between the player and the secondary game on the mobile computing device; and automatically, responsive to the indication, apply at least one award resulting from the interaction between the player and the secondary game directly to the electronic gaming machine.

2. The at least one non-transitory computer readable medium of claim 1, wherein the plurality of instructions, when executed by the at least one processor, further causes the at least one processor to display an image of a real world on at least a portion of a display screen of the mobile computing device.

3. The at least one non-transitory computer readable medium of claim 1, wherein the plurality of instructions, when executed by the at least one processor, further causes the at least one processor to display a virtual world on at least a portion of a display screen.

4. The at least one non-transitory computer readable medium of claim 1, wherein the plurality of instructions, when executed by the at least one processor, further causes the at least one processor to display a virtual world on at least a portion of a display screen of the mobile computing device.

5. The at least one non-transitory computer readable medium of claim 1, wherein the plurality of instructions, when executed by the at least one processor, further causes the at least one processor to:

display on a display screen of the mobile computing device a plurality of symbols, wherein at least one symbol of the plurality of symbols is associated with the at least one award; and receive a selection from the player of the at least one symbol.

6. The at least one non-transitory computer readable medium of claim 1, wherein the plurality of instructions, when executed by the at least one processor, further causes the at least one processor to output an indication via a display screen on the mobile computing device that the player is eligible to receive the at least one award.

7. The at least one non-transitory computer readable medium of claim 1, wherein the plurality of instructions, when executed by the at least one processor, further causes the at least one processor to receive a signal generated by touching a display screen of the mobile computing device.

8. The at least one non-transitory computer readable medium of claim 1, wherein the code comprises one or more quick response (QR) codes.

9. The at least one non-transitory computer readable medium of claim 1, wherein the plurality of instructions, when executed by the at least one processor, further cause the at least one processor to receive a signal indicating proximity of the mobile computing device to the electronic gaming machine.

10. The at least one non-transitory computer readable medium of claim 1, wherein the secondary game comprises a bonus game associated with a primary game.

11. At least one non-transitory computer readable medium that stores a plurality of instructions, wherein the plurality of instructions, when executed by at least one processor, causes the at least one processor to:

receive, from a mobile computing device, an electronic signal comprising one or more codes associated an electronic gaming machine and a mobile computing device identifier;

associate, based on the one or more codes and the mobile computing device identifier, the mobile computing device with the electronic gaming machine;

associate, based on the mobile computing device identifier, the electronic gaming machine with a player;

associate at least one award with the player, the at least one award being based on historical wagering data;

receive an indication of a user interaction between the player and a virtual world on the mobile computing device; and automatically apply, responsive to the indication of the user interaction between the player and the virtual world on the mobile computing device, the at least one award directly to the electronic gaming machine.

12. The at least one non-transitory computer readable medium of claim 11, wherein the plurality of instructions, when executed by the at least one processor, further causes the at least one processor to apply the at least one award to the electronic gaming machine responsive to selection of one of a plurality of possible interactions via a user interface.

13. The at least one non-transitory computer readable medium of claim 11, wherein the plurality of instructions, when executed by the at least one processor, further causes the at least one processor to receive a selection of one displayed symbol of a plurality of displayed symbols, wherein the one displayed symbol is associated with the at least one award.

14. The at least one non-transitory computer readable medium of claim 11, wherein the plurality of instructions, when executed by the at least one processor, further causes the at least one processor to display the virtual world on at least a portion of display screen of the mobile computing device.

15. The at least one non-transitory computer readable medium of claim 11, wherein the plurality of instructions, when executed by the at least one processor, further causes the at least one processor to display an image of a real world on at least a portion of display screen of the mobile computing device.

16. The at least one non-transitory computer readable medium of claim 11, wherein the plurality of instructions, when executed by the at least one processor, further causes the at least one processor to display an image of a real world on a display screen of the electronic gaming machine.

17. The at least one non-transitory computer readable medium of claim 11, wherein the plurality of instructions, when executed by the at least one processor, further causes the at least one processor to output an indication that the player is eligible to receive the at least one award.

18. The at least one non-transitory computer readable medium of claim 11, wherein the plurality of instructions, when executed by the at least one processor, further causes the at least one processor to receive a signal responsive to the player touching a display screen of the mobile computing device.

19. The at least one non-transitory computer readable medium of claim 11, wherein the one or more codes comprise one or more quick response (QR) codes.

20. The at least one non-transitory computer readable medium of claim 11, wherein the virtual world comprises a layered image associated with a primary game.

* * * * *